(No Model.) 3 Sheets—Sheet 1.
A. G. WILSON.
HAY PRESS.
No. 507,250. Patented Oct. 24, 1893.
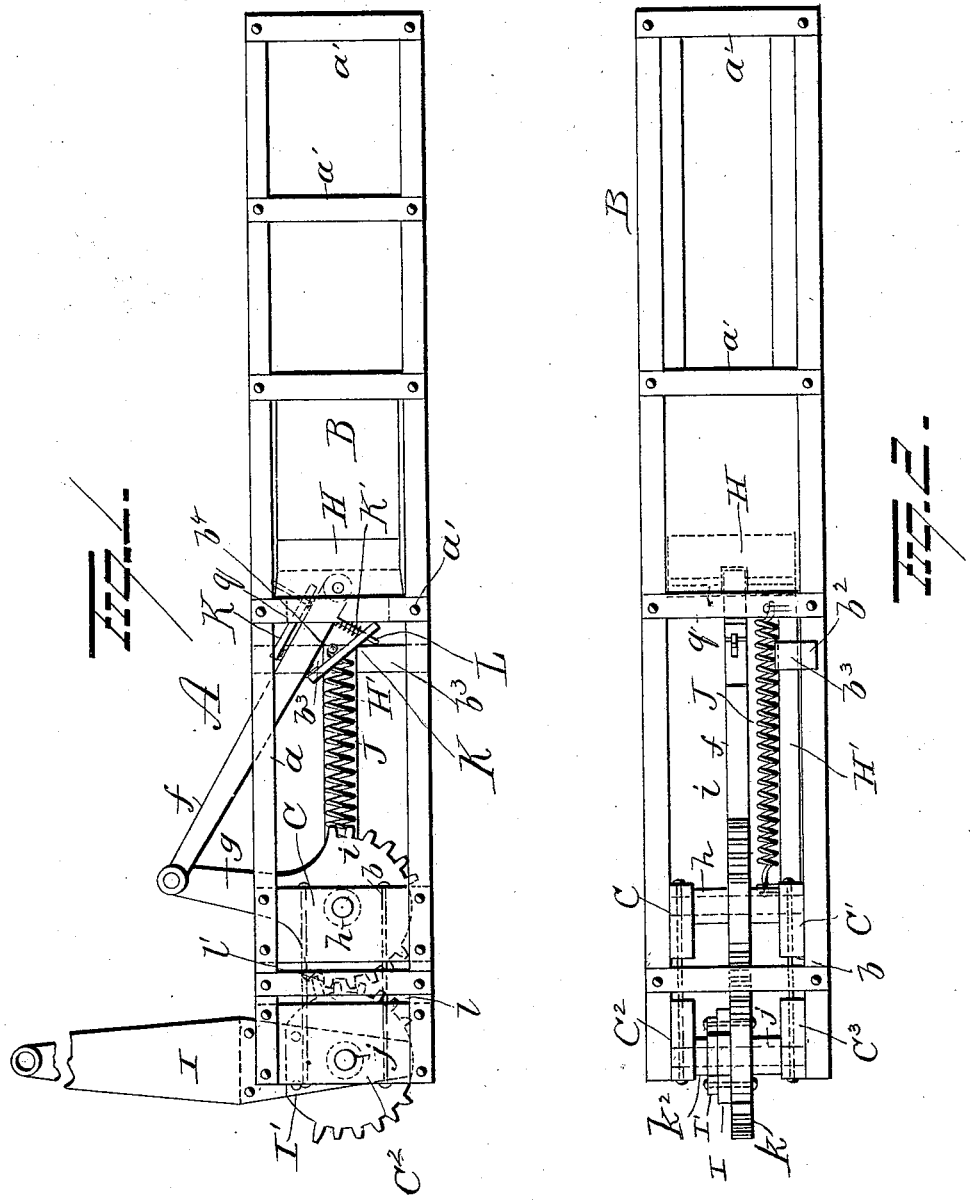
Witnesses
R. Nottingham
S. W. Foster
Inventor
A. G. Wilson
By his Attorney (No Model.) 3 Sheets—Sheet 2.
A. G. WILSON.
HAY PRESS.
No. 507,250. Patented Oct. 24, 1893.
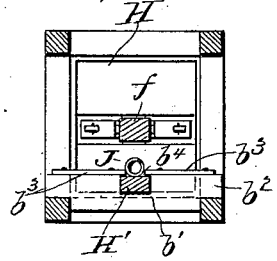
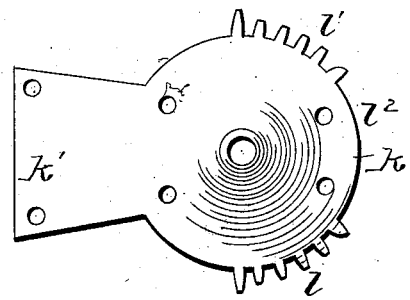
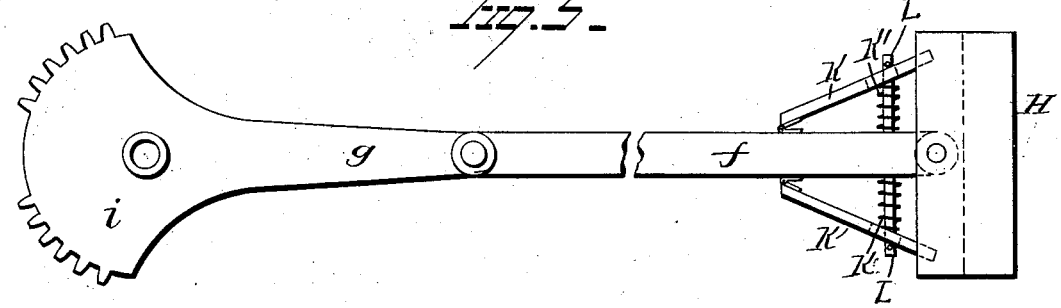
Witnesses
G. F. Downing
V. E. Hodges
Inventor
A. G. Wilson
By H. A. Seymour
Attorney

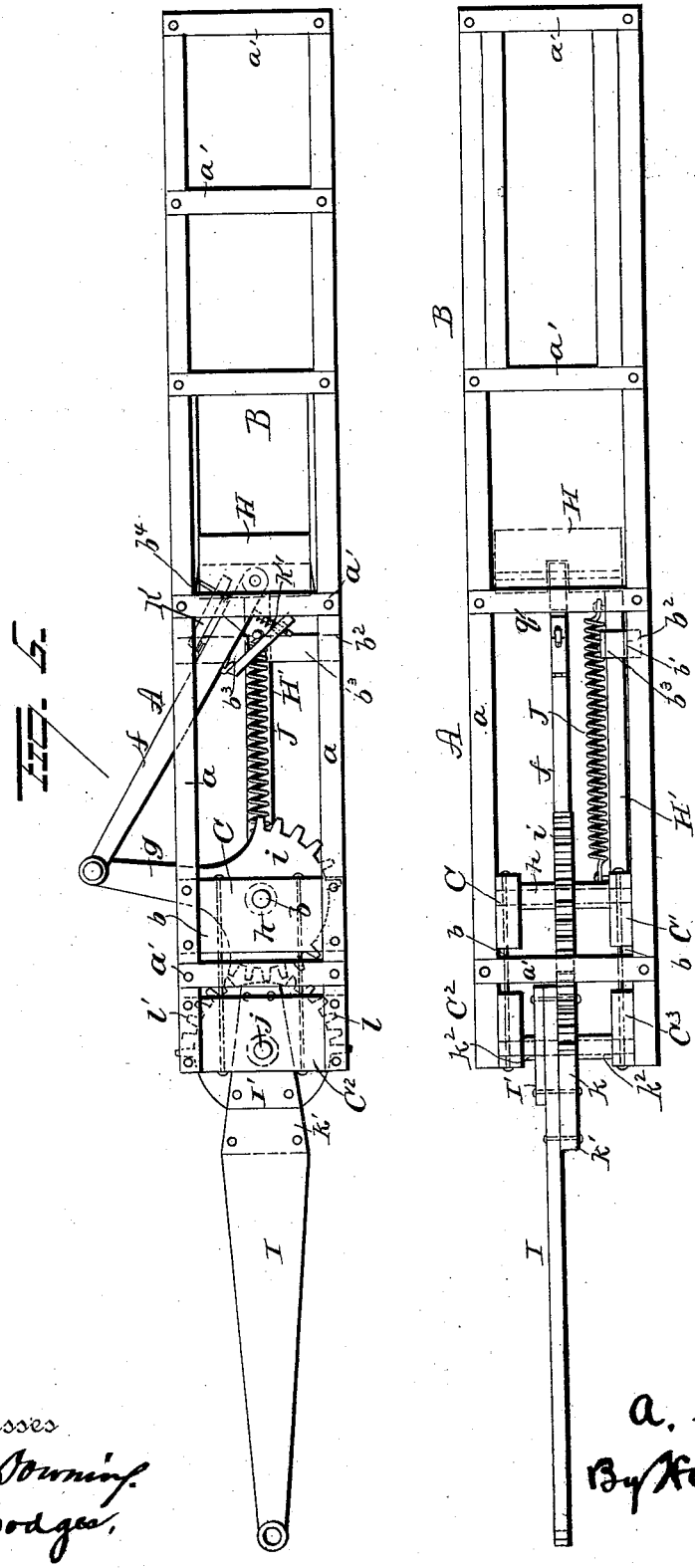

United States Patent Office.

ALBERT G. WILSON, OF WOLFE CITY, TEXAS.

HAY-PRESS.

SPECIFICATION forming part of Letters Patent No. 507,250, dated October 24, 1893.

Application filed December 20, 1892. Serial No. 455,766. (No model.)

*To all whom it may concern:*

Be it known that I, ALBERT G. WILSON, residing at Wolfe City, in the county of Hunt and State of Texas, have invented certain new and useful Improvements in Hay-Presses; and I do hereby declare the following to be a full, clear, and exact description of the invention, such as will enable others skilled in the art to which it appertains to make and use the same.

My invention relates to an improvement in hay presses,—its object being to produce a hay press which shall be simple in construction and effectual in the performance of its functions.

With this object in view the invention consists in certain novel features of construction and combinations and arrangements of parts as hereinafter set forth and pointed out in the claims.

In the accompanying drawings: Figure 1 is a plan view of my improvements. Fig. 2 is a side view. Fig. 3 is a sectional view. Figs. 4 and 5 are detail views. Fig. 6 is a plan view and Fig. 7 is a side view of the apparatus illustrating the positions of the parts when the tongue I, is at the center of its stroke.

A represents the frame of the press, in which a box B is located, said frame comprising longitudinal timbers $a$ and cross bars $a'$. A plunger H is located in the box B and has pivotally connected to it, one end of a pitman $f$, the other end of said pitman being pivotally connected to the end of an arm or lever $g$. The arm or lever $g$ is provided at its other end with a toothed segment $i$, which is loosely mounted on a vertical shaft $h$ supported between blocks C, C' secured to the timbers $a$, at the inner end of the frame of the machine. Mounted in the inner end of the frame between blocks $C^2$, $C^3$ and in proximity to the segment $i$, is a vertical shaft $j$ which carries a disk $k$ having two series of teeth $l$, $l'$, and a vacant space $l^2$ between them, said teeth being adapted to mesh with the toothed segment $i$. The blocks C, $C^2$ and C', $C^3$ are properly braced by means of rods $b$ passing through them. The inner tooth of each series of teeth is shorter than the remaining teeth and rounded, almost to a point, and the outer tooth of each series is made longer than the remaining teeth, for a purpose hereinafter explained.

The disk $k$ is preferably made with an arm $k'$ and to this arm and the disk, a tongue I is secured. A cap plate I' is placed over the tongue and fastened thereto, said plate extending across the disk and over the tongue to a point coincident with the inner end of the arm $k'$. A hub for the shaft $j$ is formed by perforated bosses $k^2$, $k^2$ projecting from the cap plate I' and the disk $k$.

The plunger H is provided with a rearwardly extending arm or bar H' which runs through a notch $b'$ in a cross bar $b^2$ secured to the lower part of the framework. Mounted on the top of the cross bar $b^2$ are plates $b^3$ extending sufficiently over the bar H' to prevent its escape from the notch $b'$, said notched bar and plates thus serving as a guide for the plunger H and its arm or bar H'. A coiled spring J is adapted to pass through the space $b^4$ between the plates $b^3$ and is attached at one end to the arm or bar H' at a point in proximity to the plunger H, and, extending over said arm or bar, is attached at its other end to the block C'.

From the construction and arrangement of parts above set forth it will be seen that when the tongue is moved outwardly from the position shown in Fig. 1, one set of teeth on the disk $k$ will mesh with the segment $i$ the teeth of which may be made in two sets and cause the arm or lever $g$ to turn, thus forcing the pitman $f$ and plunger attached thereto, forward to compress the hay in the box. It will also be seen that when the disk $k$ has been sufficiently rotated to cause one of its series of teeth to have meshed with the segment $i$ the pitman $f$ and the arm or lever $g$ will be approximately in alignment with each other. Suppose that the parts are in the positions shown in Fig. 1, and the tongue be moved to a position in line with the longitudinal axis of the machine. During this movement the plunger will have been moved forward within the box to compress the hay therein, as above explained, but the pitman $f$ and lever $g$ will not quite have moved sufficiently to align with each other. Now by providing the short rounded tooth at the inner end of the series of teeth ($l$ for instance) on the disk $k$, it will be seen that the disk $k$ will be thrown out of gear with the segment $i$ just before the lever $g$ can align with the pitman $f$,—and consequently, as the disk $k$ and segment $i$ are out of mesh, the plunger will fly back, by the action of the the spring J and the pitman $f$ and lever $g$ will reassume the positions shown in Fig. 1. Now let it be supposed that the tongue be given another quarter turn, so as to cause it to assume a position just the reverse to that shown in Fig. 1. During this movement the plunger will again be forced forward, and, as the tooth at the outer end of the series of teeth $l'$ on the disk $k$ is longer than the other teeth of the series, the lever $g$ will be carried slightly beyond alignment with the pitman $f$, so that when the series of teeth $l'$ shall have moved out of mesh with the segment $i$, the plunger will fly back, but the lever $g$ and pitman $f$ will move to the opposite side of the machine,—or, in other words, said lever and pitman will assume positions just the reverse to those shown in Fig. 1.

The operation above described will be repeated when the tongue is moved back again to the position shown in Fig. 1, and so on.

It has been found in practice that the rebounding of the plunger, caused by the spring J and the expansive action of the hay, is too sudden, and hence the brake shown in Fig. 5 is provided. In constructing this brake, two bars K are hinged to the pitman $f$ and extend backward to points in proximity to the plunger H, their free ends being disposed laterally from the pitman. Bars L are preferably screwed into the pitman $f$ and project laterally therefrom, said bars being adapted to pass through suitable perforations in the arms or bars K. Coiled springs K' encircle the bars or rods L, after passing through the bars K, and serve to force the arms or bars K outwardly so as to cause them to bear against or have frictional contact with the posts $q$ of the framework at each side of the box B. Thus it will be seen that the rebound of the plunger will be somewhat retarded.

The machine above described is very simple in construction and effectual in the performance of its functions.

Various slight changes might be made in the details of construction of my invention without departing from the spirit thereof or limiting its scope, and hence I do not wish to limit myself to the precise details of construction herein set forth, but, Having fully described my invention, what I claim as new, and desire to secure by Letters Patent, is—

1. In a hay press, the combination with a plunger, and a spring actuated arm connected with the plunger, said arm having a toothed segment thereon, of a draft attachment having a toothed segment thereon the teeth of which are divided into segregated sets, whereby a single vibration of the draft attachment will communicate as many vibrations to the spring actuated arm as there are segregated sets of teeth in the segment of the draft attachment, substantially as set forth.

2. In a hay press, the combination with a plunger, and a toggle lever connected therewith and a toothed segment carried by one arm of said toggle lever, of a tongue, a disk connected with the tongue and having more than one set of teeth, and a vacant space between said sets of teeth, the teeth on said disk being so constructed and arranged as to prevent the parts of the toggle lever from stopping in alignment with each other, and a spring for returning said plunger, substantially as set forth.

3. In a hay press, the combination with a box, plunger and framework, of an arm carried by the plunger, a cross bar carried by the framework and having a notch to receive said arm, plates secured to the cross bar and projecting over each arm, a spring secured at one end to said arm in proximity to the plunger and at the other end to the rear end of the framework, and means for operating said plunger to force it forwardly, substantially as set forth.

4. In a hay press, the combination with a framework, a box and a plunger, of a pitman connected to the plunger, a lever pivotally connected to said pitman and carrying a toothed segment at one end, an oscillatory disk having two series of teeth in its periphery and a blank space between said series of teeth, the inner tooth of each series being made shorter than the remaining teeth, and the outer tooth of each series being made longer than the remaining teeth of the series, and a tongue connected with said toothed disk, and a spring connected at one end with the plunger and at the other end with the framework of the machine, substantially as set forth.

5. In a hay press, the combination with a box, plunger, and pitman, of brake hinged to the pitman, and yielding means for throwing the brake outward in position to strike some rigid part of the machine, substantially as set forth.

6. In a hay press, the combination with a box, a plunger and an arm or pitman connected with said plunger, of bars hinged to said arm or pitman and projecting toward the plunger, rods or bars secured to the arm or pitman and projecting laterally therefrom and through the hinged bars, and springs encircling said laterally projecting rods or bars and adapted to force the hinged bars against the frame of the box, substantially as set forth.

7. In a hay press, the combination with a box, a plunger and an arm or pitman connected with said plunger, of bars hinged to said arm or pitman and projecting toward the plunger, rods or bars connected to said arm or pitman and projecting laterally therefrom, and coiled spring encircling said laterally projecting rods or bars and adapted to force the hinged bars outwardly, substantially as and for the purpose set forth.

8. In a hay press, the combination with a plunger, and framework, of a pitman connected to the plunger, a lever pivotally connected to the pitman, blocks secured to the upper and lower parts of the framework, a shaft mounted in said blocks and carrying said lever, a toothed segment at the end of said lever, other blocks secured to the upper and lower parts of the framework, a shaft mounted in said last mentioned blocks, a toothed disk carried by said shaft and adapted to mesh with said toothed segment, and rods passing through the blocks secured to the upper part of the frame and adapted to brace them and rods passing through the blocks secured to the lower part of the frame and adapted to brace them, substantially as set forth.

In testimony whereof I have signed this specification in the presence of two subscribing witnesses.

ALBERT G. WILSON.

Witnesses:
J. B. STONE,
W. H. STONE.